(12) United States Patent
Kobayashi et al.

(10) Patent No.: US 12,177,609 B2
(45) Date of Patent: Dec. 24, 2024

(54) COMMUNICATION APPARATUS, COMMUNICATION CONTROL METHOD, AND NON-TRANSITORY COMPUTER READABLE MEDIUM

(71) Applicant: NEC Corporation, Tokyo (JP)

(72) Inventors: Kosei Kobayashi, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 17/288,191

(22) PCT Filed: Sep. 24, 2019

(86) PCT No.: PCT/JP2019/037161
§ 371 (c)(1),
(2) Date: Apr. 23, 2021

(87) PCT Pub. No.: WO2020/090285
PCT Pub. Date: May 7, 2020

(65) Prior Publication Data
US 2021/0409650 A1    Dec. 30, 2021

(30) Foreign Application Priority Data
Oct. 31, 2018 (JP) ................. 2018-205344

(51) Int. Cl.
*H04N 7/18* (2006.01)
*B60W 40/04* (2006.01)
(Continued)

(52) U.S. Cl.
CPC ............ *H04N 7/183* (2013.01); *B60W 40/04* (2013.01); *G08G 1/0112* (2013.01); *G08G 1/04* (2013.01);
(Continued)

(58) Field of Classification Search
CPC ....... H04N 7/183; H04N 7/181; B60W 40/04; B60W 2420/42; G08G 1/16; G08G 1/0112; G08G 1/04; G08G 1/093; G08G 3/02
(Continued)

(56) References Cited

U.S. PATENT DOCUMENTS

| 8,384,825 B2* | 2/2013 | Takemura ............ H04N 23/951 |
| | | 348/148 |
| 8,441,535 B2* | 5/2013 | Morin .................. H04N 25/443 |
| | | 382/104 |

(Continued)

FOREIGN PATENT DOCUMENTS

| JP | H06-118174 A | 4/1994 |
| JP | 2001-055100 A | 2/2001 |

(Continued)

OTHER PUBLICATIONS

JP Office Action for JP Application No. 2022-149760, mailed on Sep. 26, 2023 with English Translation.
(Continued)

*Primary Examiner* — Christopher S Kelley
*Assistant Examiner* — Asmamaw G Tarko

(57) ABSTRACT

A communication apparatus (10) includes: a communication unit (11) configured to transmit sensor information detected using at least two or more sensors, the two or more sensors being adapted to detect states of a mobile body in directions different from one another with the mobile body being a base point; a moving state recognition unit (12) configured to recognize a moving state; a peripheral state recognition unit (13) configured to recognize a peripheral state of the mobile body; and a communication control unit (14) configured to determine a priority level of each of the two or more sensors based on the moving state and the peripheral state and perform communication control so that the sensor informa- (Continued)

tion detected by the sensor having a high priority level is transmittable in quality higher than that of the sensor information detected by the sensor having a low priority level.

18 Claims, 11 Drawing Sheets

(51) Int. Cl.
*G08G 1/01* (2006.01)
*G08G 1/04* (2006.01)
*G08G 1/09* (2006.01)
*G08G 1/16* (2006.01)

(52) U.S. Cl.
CPC .............. *G08G 1/093* (2013.01); *G08G 1/16* (2013.01); *H04N 7/181* (2013.01); *B60W 2420/403* (2013.01)

(58) Field of Classification Search
USPC ........................................................ 348/148
See application file for complete search history.

(56) References Cited

U.S. PATENT DOCUMENTS

| | | | | |
|---|---|---|---|---|
| 8,582,182 | B2* | 11/2013 | Zahnert | H04N 1/3876 |
| | | | | 382/284 |
| 11,032,681 | B2* | 6/2021 | Hitotsumatsu | H04W 4/44 |
| 11,250,708 | B2* | 2/2022 | Shimizu | G08G 1/202 |
| 2007/0001512 | A1* | 1/2007 | Sato | H04N 7/18 |
| | | | | 307/9.1 |
| 2014/0002651 | A1* | 1/2014 | Plante | H04N 5/76 |
| | | | | 348/148 |
| 2015/0158495 | A1 | 6/2015 | Duncan et al. | |
| 2016/0167729 | A1 | 6/2016 | Pezzi et al. | |
| 2016/0191861 | A1* | 6/2016 | Tinskey | H04L 65/764 |
| | | | | 348/148 |
| 2017/0186319 | A1* | 6/2017 | Tsushima | G08G 1/16 |
| 2019/0082314 | A1* | 3/2019 | Yukizaki | H04W 28/0226 |
| 2019/0394626 | A1* | 12/2019 | Hitotsumatsu | H04W 4/38 |
| 2021/0264224 | A1* | 8/2021 | Tamaoki | G01S 7/411 |
| 2022/0279428 | A1* | 9/2022 | Naik | H04W 4/80 |
| 2022/0345548 | A1* | 10/2022 | Seemann | H04L 69/08 |

FOREIGN PATENT DOCUMENTS

| | | |
|---|---|---|
| JP | 2001-061185 A | 3/2001 |
| JP | 2005-222307 A | 8/2005 |
| JP | 2007-013497 A | 1/2007 |
| JP | 2007-281623 A | 10/2007 |
| JP | 2008-227646 A | 9/2008 |
| JP | 2010-034831 A | 2/2010 |
| JP | 2010-173366 A | 8/2010 |
| JP | 2010-283722 A | 12/2010 |
| JP | 2012-053585 A | 3/2012 |
| JP | 2015-158421 A | 9/2015 |
| JP | 2016-502627 A | 1/2016 |
| JP | 2016-032258 A | 3/2016 |
| JP | 2016-134816 A | 7/2016 |
| JP | 2018-142921 A | 9/2018 |
| WO | 2016/092591 A1 | 6/2016 |

OTHER PUBLICATIONS

JP Office Action for JP Application No. 2022-149760, mailed on Jun. 27, 2023 with English Translation.
International Search Report for PCT Application No. PCT/JP2019/037161, mailed on Nov. 12, 2019.

* cited by examiner

|  | | MOVING STATE OF VEHICLE | |
|---|---|---|---|
|  | | MOVING FORWARD | MOVING BACKWARD |
| PRESENCE OR ABSENCE OF APPROACHING VEHICLE (FRONT CAMERA, REAR CAMERA) | (ABSENT, ABSENT) | (FRONT 2, REAR 0) | (FRONT 0, REAR 2) |
| | (ABSENT, PRESENT) | (FRONT 2, REAR 1) | (FRONT 0, REAR 2) |
| | (PRESENT, ABSENT) | (FRONT 2, REAR 0) | (FRONT 1, REAR 2) |
| | (PRESENT, PRESENT) | (FRONT 2, REAR 1) | (FRONT 1, REAR 2) |

Fig. 3

|  | MOVING STATE OF VEHICLE (PREDICTION) | |
| --- | --- | --- |
|  | TURN LEFT | TURN RIGHT |
| PRESENCE OR ABSENCE OF APPROACHING VEHICLE (LEFT CAMERA, RIGHT CAMERA) — (ABSENT, ABSENT) | (LEFT 2, RIGHT 0) | (LEFT 0, RIGHT 2) |
| (ABSENT, PRESENT) | (LEFT 2, RIGHT 1) | (LEFT 0, RIGHT 2) |
| (PRESENT, ABSENT) | (LEFT 2, RIGHT 0) | (LEFT 1, RIGHT 2) |
| (PRESENT, PRESENT) | (LEFT 2, RIGHT 1) | (LEFT 1, RIGHT 2) |

Fig. 6

|  | | MOVING STATE OF VEHICLE | |
|---|---|---|---|
|  | | MOVING FORWARD | MOVING BACKWARD |
| PRESENCE OR ABSENCE OF APPROACHING VEHICLE (PREDICTION) (FRONT CAMERA, REAR CAMERA) | (ABSENT, ABSENT) | (FRONT 2, REAR 0) | (FRONT 0, REAR 2) |
| | (ABSENT, PRESENT) | (FRONT 2, REAR 1) | (FRONT 0, REAR 2) |
| | (PRESENT, ABSENT) | (FRONT 2, REAR 0) | (FRONT 1, REAR 2) |
| | (PRESENT, PRESENT) | (FRONT 2, REAR 1) | (FRONT 1, REAR 2) |

Fig. 7

| | | MOVING STATE OF VEHICLE (PREDICTION) | |
|---|---|---|---|
| | | TURN LEFT | TURN RIGHT |
| PRESENCE OR ABSENCE OF APPROACHING VEHICLE (PREDICTION) (LEFT CAMERA, RIGHT CAMERA) | (ABSENT, ABSENT) | (LEFT 2, RIGHT 0) | (LEFT 0, RIGHT 2) |
| | (ABSENT, PRESENT) | (LEFT 2, RIGHT 1) | (LEFT 0, RIGHT 2) |
| | (PRESENT, ABSENT) | (LEFT 2, RIGHT 0) | (LEFT 1, RIGHT 2) |
| | (PRESENT, PRESENT) | (LEFT 2, RIGHT 1) | (LEFT 1, RIGHT 2) |

Fig. 8

COMMUNICATION APPARATUS, COMMUNICATION CONTROL METHOD, AND NON-TRANSITORY COMPUTER READABLE MEDIUM

This application is a National Stage Entry of PCT/JP2019/037161 filed on Sep. 24, 2019, which claims priority from Japanese Patent Application 2018-205344 filed on Oct. 31, 2018, the contents of all of which are incorporated herein by reference, in their entirety.

TECHNICAL FIELD

The present disclosure relates to a communication apparatus, a communication control method, and a program.

BACKGROUND ART

In recent years, self-driving technology has been developed and self-driving vehicles have been tested on public roads. Usually, a self-driving vehicle has various sensors mounted thereon for recognizing the peripheral state of the vehicle such as the presence or the absence of a pedestrian and the presence or the absence of another vehicle. Examples of the various sensors include cameras and radars. Information detected by the various sensors is used in performing driving control.

Patent Literature 1 discloses that when a self-driving control apparatus detects an object in the periphery of a self-driving vehicle, it transmits meta-information related to the object (e.g., an object code, size information of the object, and positional information of the object) to a remote control apparatus. When a plurality of objects are detected, the self-driving control apparatus transmits meta-information related to the objects in the order of the levels of importance of the objects to the remote control apparatus. The level of importance of an object increases the closer it is to the self-driving vehicle.

Further, Patent Literature 2 discloses a system in which a server collects images captured by on-board cameras mounted on a vehicle. Each on-board camera mounted on a vehicle starts taking a video based on a shooting spot and a shooting direction indicated by the server for the purpose of taking a video of a specific object. When each on-board camera starts taking a video, the video bit rate is determined for the plurality of on-board cameras. The video bit rate allocated to each on-board camera is determined by taking into account the position of the vehicle, the traveling direction of the vehicle, or the like.

CITATION LIST

Patent Literature

Patent Literature 1: Japanese Unexamined Patent Application Publication No. 2018-142921
Patent Literature 2: Japanese Unexamined Patent Application Publication No. 2016-134816

SUMMARY OF INVENTION

Technical Problem

In Patent Literature 1, when a plurality of objects are detected, the self-driving control apparatus is able to determine the objects having high levels of importance and transmit the meta-information related to the objects having the high levels of importance in the order of the levels of importance. With the method disclosed in Patent Literature 1, it is possible to determine the level of importance of each object, however it is not possible to determine the level of importance of each sensor such as an on-board camera. Therefore, when transmitting the sensor information itself such as the video data instead of the meta-information, it is not possible to determine which sensor information should be transmitted preferentially.

With the method disclosed in Patent Literature 2, for the purpose of taking a video of a specific object, the video bit rate of each on-board camera is controlled based on the positional relationship of the specific object with respect to each on-board camera. Therefore, in the case where it is difficult to specify or designate beforehand an object for which the video is to be taken, like in the case where a self-driving vehicle is remotely monitored, it is not possible to determine which video data of the on-board cameras should be transmitted preferentially.

An object of the present disclosure is to provide a communication apparatus, a communication control method, and a program capable of transmitting the sensor information acquired by a sensor mounted on a mobile body such as a vehicle to a remote apparatus or the like based on a level of importance of the sensor.

Solution to Problem

A communication apparatus according to a first exemplary aspect of the present disclosure includes:
 a communication unit configured to transmit sensor information detected using at least two or more sensors disposed in a mobile body, the two or more sensors being adapted to detect states of the mobile body in directions different from one another with the mobile body being a base point;
 a moving state recognition unit configured to recognize a moving state of the mobile body;
 a peripheral state recognition unit configured to recognize a peripheral state of the mobile body; and
 a communication control unit configured to determine a priority level of each of the two or more sensors based on the moving state and the peripheral state and perform communication control so that the sensor information detected by the sensor having a high priority level is transmittable in quality higher than that of the sensor information detected by the sensor having a low priority level.

A communication control method according to a second exemplary aspect of the present disclosure includes:
 recognizing a moving state of a mobile body;
 recognizing a peripheral state of the mobile body;
 determining a priority level of each of at least two or more sensors disposed in the mobile body based on the moving state and the peripheral state, the two or more sensors being adapted to detect the states of the mobile body in directions different from one another with the mobile body being a base point;
 performing communication control so that sensor information detected by the sensor having a high priority level is transmittable in quality higher than that of sensor information detected by the sensor having a low priority level; and
 transmitting the sensor information.

A program according to a third exemplary aspect of the present disclosure causes a computer to perform the processes of:

recognizing a moving state of a mobile body;
recognizing a peripheral state of the mobile body;
determining a priority level of each of at least two or more sensors disposed in the mobile body based on the moving state and the peripheral state, the two or more sensors being adapted to detect the states of the mobile body in directions different from one another with the mobile body being a base point;
performing communication control so that sensor information detected by the sensor having a high priority level is transmittable in quality higher than that of sensor information detected by the sensor having a low priority level; and
transmitting the sensor information.

Advantageous Effects of Invention

According to the present disclosure, it is possible to provide a communication apparatus, a communication control method, and a program capable of transmitting the sensor information acquired by a sensor mounted on a mobile body such as a vehicle to a remote apparatus or the like based on a level of importance of the sensor.

BRIEF DESCRIPTION OF DRAWINGS

FIG. 3 is a diagram showing priority levels determined by a communication control unit according to the second example embodiment;

FIG. 6 is a diagram showing priority levels determined by a communication control unit according to a fourth example embodiment;

FIG. 7 is a diagram showing priority levels determined by the communication control unit according to the fourth example embodiment;

FIG. 8 is a diagram showing priority levels determined by the communication control unit according to the fourth example embodiment;

DESCRIPTION OF EMBODIMENTS

First Example Embodiment

Figure 1:
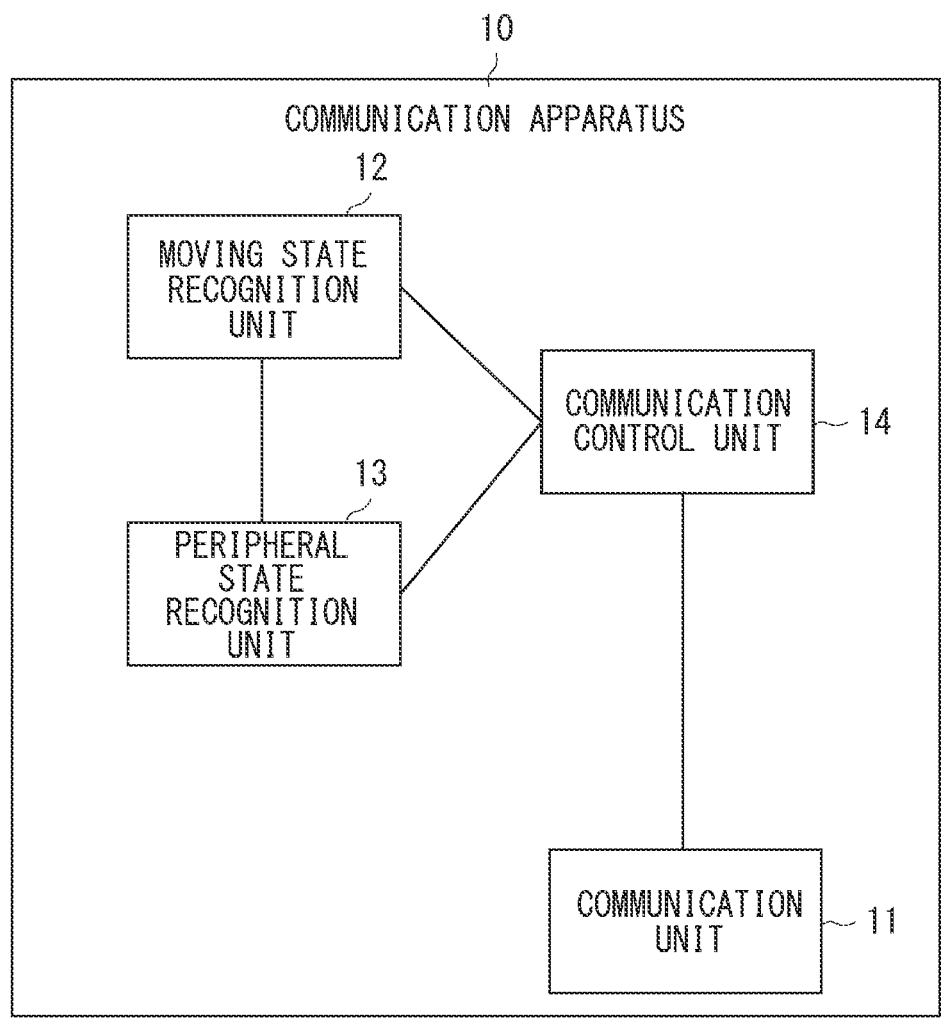
FIG. 1 is a configuration diagram of a communication apparatus according to a first example embodiment.

Hereinbelow, example embodiments of the present disclosure will be described with reference to the figures. A configuration example of a communication apparatus 10 according to a first example embodiment will be described with reference to FIG. 1. The communication apparatus 10 may be a computer device that operates by causing a processor to execute the programs stored in a memory. Further, the communication apparatus 10 may be installed in a mobile body. The mobile body may be transportation means such as a vehicle (e.g. an automobile, a train, construction machinery, and AGV (Automated Guided Vehicle)), a manned aerial vehicle, UAV (Unmanned Aerial Vehicle), or a ship.

The communication apparatus 10 includes a communication unit 11, a moving state recognition unit 12, a peripheral state recognition unit 13, and a communication control unit 14. The constituent components of the communication apparatus 10 such as the communication unit 11, the moving state recognition unit 12, the peripheral state recognition unit 13, and the communication control unit 14 may each be a software component or a module whose processing is carried out by causing the processor to execute the programs stored in the memory. Further, the constituent components of the communication apparatus 10 may be hardware components such as a circuit, a chip, and the like.

The communication unit 11 transmits the sensor information acquired by two or more sensors disposed in the mobile body to a server or the like via a network. The two or more sensors are disposed in the mobile body so that they can detect the states of the mobile body in directions different from one another with the mobile body being the base point. The directions different from one another may be, for instance, the directions to the front, the rear, the right, and the left of the mobile body. The detection of the states may be, for instance, detecting people, an obstacle, other mobile bodies, a traffic sign, or the like in each direction with respect to the mobile body.

The types of the sensors include a camera, a millimeter wave radar, an infrared camera, an ultrasonic sonar, and LiDAR (Light Detection and Ranging). The two or more sensors mentioned above may be one type of sensor or may be different types of sensors.

At least two or more sensors are disposed in the mobile body. The two or more sensors are disposed in the mobile body so that they can detect the changes in the states of the mobile body in the directions to the front and to the rear of the mobile body and further, to the right and to the left of the mobile body. For instance, the sensor disposed in the mobile body on the front side thereof may detect a change in the state of the mobile body in the direction to the front of the mobile body, and the sensor disposed in the mobile body on the rear side thereof may detect a change in the state of the mobile body in the direction to the rear of the mobile body. Alternatively, when a plurality of sensors are disposed at specific positions of the mobile body, they may be disposed such that each sensor has a detection region different from one another. The detection region may be referred to as, for instance, a sensing region.

The communication unit 11 may transmit the sensor information to the server via a radio communication line. The radio communication line may be, for instance, a mobile network such as 3G, 4G, LTE (Long Term Evolution), or 5G whose specifications are defined by 3GPP (3rd Generation Partnership Project) or the like, or may be a wireless LAN (Local Area Network). Alternatively, the communication unit 11 may transmit the sensor information to the server via a wired communication line.

The server may be a computer device that operates by causing a processor to execute the programs stored in a memory. The server may, for instance, remotely monitor the mobile body with reference to the sensor information received from the communication apparatus 10.

The moving state recognition unit 12 recognizes the moving state of the mobile body. The moving state may be information indicating the direction in which the mobile body moves. For instance, the moving state may be information indicating whether the mobile body is moving forward or backward. Further, the moving state may be information indicating whether the mobile body has turned right and is advancing in the direction to the right thereof or has turned left and is advancing in the direction to the left thereof. Further, the moving state may be information indicating the speed or the acceleration of the mobile body. Further, the moving state may be information indicating whether or not the mobile body is in a stopped state. The moving state recognition unit 12 outputs the information as regards the moving state to the communication control unit 14.

The peripheral state recognition unit 13 recognizes the peripheral state of the mobile body. In the case where the mobile body is a vehicle, the peripheral state may refer to, for instance, the presence or the absence of a pedestrian, another vehicle, an obstacle, a traffic sign, a traffic signal, or the like in the periphery of the mobile body. Further, in the case where the mobile body is an airplane, the peripheral state may refer to, for instance, information indicating the weather condition in the periphery of the mobile body. The peripheral state recognition unit 13 outputs the information as regards the peripheral state of the mobile body to the communication unit 11. Note that the information as regards the peripheral state of the mobile body may include information indicating the direction in which the instant peripheral state is viewed. The direction described herein may refer to the relative direction with respect to the orientation of the vehicle, or may be the absolute direction with respect to the magnetic north or the true north.

The communication control unit 14 determines the priority level of each sensor based on the moving state and the peripheral state of the mobile body. Further, the communication control unit 14 performs communication control so that the sensor information detected by the sensor having a high priority level can be transmitted in quality higher than that of the sensor information detected by the sensor having a low priority level. The priority level may be continuous values, or may be defined by discrete values such as a plurality of levels or stages of two or more. The communication control unit 14 may, for instance, determine the priority level of each sensor in accordance with the combination of the moving state and the peripheral state of the mobile body. The communication control may be performed by, for instance, allocating more communication bandwidth to the sensor information detected by the sensor having a high priority level than to the sensor information detected by the sensor having a low priority level in transmitting the sensor information. Alternatively, the communication control may be performed by transmitting the sensor information detected by the sensor having a high priority level at a timing earlier than the transmission of the sensor information detected by the sensor having a low priority level.

As described above, the communication apparatus 10 shown in FIG. 1 can determine the priority level of each of the two or more sensors disposed in the mobile body with reference to not only the peripheral state of the mobile body but also to the moving state thereof. Therefore, for instance, even when it is indicated in the peripheral state that there is no pedestrian in the periphery of the mobile body, the communication apparatus 10 can determine the priority level of each sensor disposed in the mobile body taking the moving state of the mobile body into further consideration. Alternatively, even when it is indicated in the peripheral state that there is a pedestrian in each of the directions to the front and the rear of the mobile body, it is possible to determine which one of the front sensor or the rear sensor should take precedence over the other sensor by taking the moving state of the mobile body into further consideration. By this configuration, when only the peripheral state is used, even if the sensor can be determined to be a sensor having a priority level that is lower or higher than necessary, the communication apparatus 10 is able to optimize the priority level of the sensor by taking the moving state into further consideration. Consequently, it is possible for the communication apparatus 10 to determine the priority level of the sensor with high precision, and the sensor information detected by the sensor having a high priority level, which is transmitted to the server or the like, can be maintained of a high quality compared to the sensor information detected by the sensor having a low priority level.

Second Example Embodiment

Figure 2:
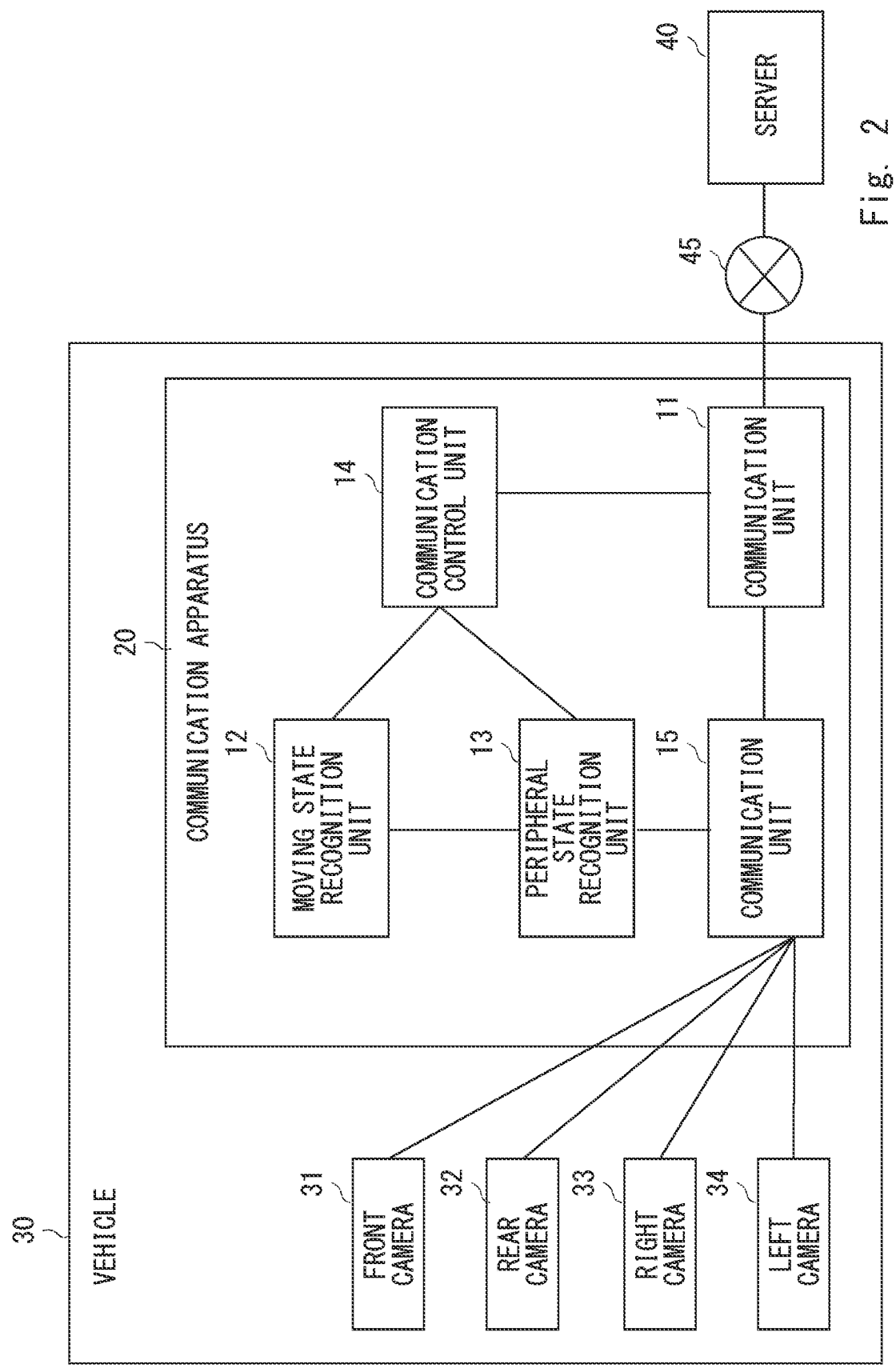
FIG. 2 is a configuration diagram of a communication system according to a second example embodiment.

Next, a configuration example of a communication system according to a second example embodiment will be described with reference to FIG. 2. A communication system shown in FIG. 2 includes a communication apparatus 20, a vehicle 30, a sever device 40, and a network 45. The communication apparatus 20 is mounted on the vehicle 30.

The communication apparatus 20 performs communication with the server 40 via the network 45. The network 45 may be, for instance, an IP (Internet Protocol) network. Specifically, the internet or an intranet may be used for the network 45. Further, the network 45 may be a mobile network or a wireless LAN. The communication apparatus 20 may be connected to the network 45 via a radio communication line such as a mobile network or a wireless LAN.

Next, a configuration example of the constituent components of the vehicle 30 other than the communication apparatus 20 will be described. The vehicle 30 corresponds to a mobile body. The vehicle 30 may be, for instance, a self-driving vehicle monitored or controlled remotely. The self-driving vehicle may be, for instance, a vehicle that is able to travel without involving human-driving. Alternatively, the self-driving vehicle may be, for instance, a vehicle that is able to travel by performing operations that are easier than the operations normally performed in a human-driven vehicle. Controlling the vehicle remotely may be, for instance, causing the server 40 to control the vehicle 30 via the network 45. The vehicle 30 includes a front camera 31, a rear camera 32, a right camera 33, and a left camera 34 as sensors. The front camera 31 is able to take a video in the direction to the front of the vehicle 30. The rear camera 32 is able to take a video in the direction to the rear of the vehicle 30. The right camera 33 is able to take a video in the direction to the right of the vehicle 30. The left camera 34 is able to take a video in the direction to the left of the vehicle 30.

Each of the front camera 31, the rear camera 32, the right camera 33, and the left camera 34 transmits the video data of the video it has taken to the communication apparatus 20. The video data may be the data yet to be compressed and converted, that is, the data before being encoded, or may be the data after being compressed and converted, that is, the encoded data. The front camera 31, the rear camera 32, the right camera 33, and the left camera 34 may transmit the video data as a packet.

The front camera 31, the rear camera 32, the right camera 33, and the left camera 34 may transmit the video data to the communication apparatus 20 via an IP network such as a LAN (Local Area Network) constructed within the vehicle 30. The front camera 31, the rear camera 32, the right camera 33, and the left camera 34 may transmit the video data to the communication apparatus 20 via a network constructed using, for instance, Ethernet (registered trademark). Alternatively, each of the front camera 31, the rear camera 32, the right camera 33, and the left camera 34 may transmit the video data to the communication apparatus 20 via CAN (Controller Area Network). Further, each of the front camera 31, the rear camera 32, the right camera 33, and the left camera 34 may transmit the video data to the communication apparatus via USB (Universal Serial Bus) or HDMI (High-Definition Multimedia Interface) (registered trademark).

Next, a configuration example of the communication apparatus 20 will be described. The communication apparatus 20 has a configuration in which a communication unit 15 is added to the communication apparatus 10 shown in FIG. 1. Detailed descriptions of the constituent components of the communication apparatus 20 that are the same as those of the communication apparatus 10 will be omitted. The communication unit 11 is connected to the network 45. For instance, the communication unit 11 is connected to the network 45 via a radio communication line.

The communication unit 15 receives the video data from each camera mounted on the vehicle 30. The communication unit 15 outputs the received video data to the communication unit 11 and the peripheral state recognition unit 13.

The peripheral state recognition unit 13 recognizes the peripheral state of the mobile body for each camera with reference to the received video data.

For instance, the peripheral state recognition unit 13 recognizes the peripheral state of the mobile body acquired by each camera based on the traffic characteristics of the received video data. The peripheral state recognition unit 13 outputs information as regards the peripheral state of the mobile body acquired by each camera to the communication control unit 14. The peripheral state may be rephrased as the peripheral environment. The traffic characteristics may be, for example, a transfer rate, an average packet interval, an average packet size, or a jitter. For instance, it is assumed that the video data received by the peripheral state recognition unit 13 is encoded based on the MPEG (Moving Picture Experts Group) standards. Alternatively, the peripheral state recognition unit 13 may perform video encoding of the received video data based on the MPEG standards. In the video encoding based on the MPEG standards, a technique of compressing the frame size by transmitting the difference information indicating the difference between the precedent frame and current frame is widely used. In the case of using the aforementioned technique of compressing the frame, the effect of the compression is higher in the video data in which there are not many changes in the images compared to the video data in which there are many changes in the images, and the transfer data amount or the transfer rate are small. On the other hand, in the video data in which there are many changes in the images, the compression effect is weakened and the transfer data amount or the transfer rate are large compared to the video data in which there are not many changes in the images. That is, the traffic characteristics of the video data change in accordance with the degree of changes in the images in the video data.

For instance, when the transfer rate is higher than the predetermined threshold value, the peripheral state recognition unit 13 recognizes that degree of changes in the images in the video data is larger than the predetermined threshold value. That is, when the transfer rate is higher than the predetermined threshold value, the peripheral state recognition unit 13 recognizes that a pedestrian or the like that was not seen in the frame of the previously received video data is seen in the frame of the received video data. A pedestrian or the like refers to, for instance, a pedestrian, another vehicle, an obstacle, a traffic signal, a traffic sign, or the like. When the transfer rate is smaller than the predetermined threshold value, the peripheral state recognition unit 13 recognizes that the state in which a pedestrian, another vehicle, an obstacle, a traffic signal, a traffic sign, or the like is not seen in the video data continues in the frame of the received video data.

Alternatively, the peripheral state recognition unit 13 may perform analysis of the content of the images in the received video data to thereby recognize whether or not there is a pedestrian, another vehicle, an obstacle, a traffic signal, a traffic sign, or the like seen in the received video data. The analysis of the content of the images may be rephrased as the image processing or the image recognition processing. The image recognition processing is processing in which the peripheral state recognition unit 13 extracts the feature quantity within the video data and compares the extracted feature quantity with the feature quantity of the object registered in a memory or the like of the communication apparatus 20 in advance. The object is, for instance, a human being, a vehicle, an obstacle, a traffic light, a traffic sign, or the like. The peripheral state recognition unit 13 recognizes that a pedestrian, another vehicle, an obstacle, a traffic signal, a traffic sign, or the like is seen in the video data when the extracted feature quantity matches with the registered feature quantity of the object or the number of points that match between the extracted feature quantity and the registered feature quantity exceed a predetermined value. Alternatively, reference image data as regards the position of the camera and the shooting direction thereof is prepared in advance, and by comparing the image acquired by taking a video with the reference image data, it is possible to recognize the presence of the object that is not included in the reference image data.

The moving state recognition unit 12 acquires control information of, for instance, an actuator, a sensor, or the like of the vehicle 30 via CAN which is an on-board network constructed within the vehicle 30. The moving state recognition unit 12 recognizes the moving state of the vehicle 30 with reference to the control information. The moving state indicates the traveling direction and the traveling speed of the vehicle, and the presence or the absence of changes in the traveling direction and the traveling speed as well as the degree of the changes. The moving state may not necessarily indicate the current state and may be a predicted value of the future state. For instance, by acquiring a turn signal information as the control information, the moving state recognition unit 12 recognizes that the vehicle 30 is making a right turn or a left turn, or is going to make a right turn or a left turn after elapse of a prescribed period. Further, the moving state recognition unit 12 confirms that the vehicle 30 is moving forward or backward by acquiring the gearshift information. The moving state recognition unit 12 may recognize or predict the speed or the acceleration of the vehicle 30 with reference to the vehicle speed sensor information. Further, the moving state recognition unit 12 recognizes that the vehicle 30 is reducing its speed by acquiring the brake information. The moving state recognition unit 12 outputs the information recognized as the moving state of the vehicle 30 to the communication control unit 14. The control information may be rephrased as the equipment information of equipment such as an actuator mounted on the vehicle 30. Further, prediction may be rephrased as estimation or calculation.

Alternatively, when the vehicle 30 is a self-driving vehicle, the traveling direction and the traveling speed of the vehicle 30 are controlled using a software for controlling traveling of a vehicle. In this case, the moving state recognition unit 12 may acquire, from a software, information such as the moving state of the vehicle 30, for instance, whether the vehicle is moving forward or backward, and whether it is going to turn right or turn left. The information which the moving state recognition unit 12 acquires from the software may be rephrased as the traveling control information.

The communication control unit 14 determines the priority level of the front camera 31, the rear camera 32, the right camera 33, and the left camera 34 with reference to the information received from the moving state recognition unit 12 and the peripheral state recognition unit 13. Here, the priority level determined by the communication control unit 14 is described with reference to FIG. 3. In FIG. 3, the priority level is expressed by numerical values of 0, 1, or 2. The numerical value 2 expresses the highest priority and the numerical value 0 expresses the lowest priority.

It is assumed, for instance, that the communication control unit 14 acquired, from the moving state recognition unit 12, the information that the vehicle 30 is moving forward. In this case, the communication control unit 14 sets the priority level 2 for the front camera 31. The communication control unit 14 sets the priority level 2 for the rear camera 32 when it acquires the information that the vehicle 30 is moving backward.

Next, when the vehicle 30 is moving forward, the communication control unit 14 determines whether or not a pedestrian, another vehicle, an obstacle, a traffic signal, a traffic sign, or the like is seen in the video data acquired from the rear camera 32 with reference to the information received from the peripheral state recognition unit 13. The communication control unit 14 sets the priority level 1 for the rear camera 32 when the vehicle 30 is moving forward and another vehicle or the like is seen in the video data acquired from the rear camera 32, that is, when another vehicle or the like is approaching the vehicle 30 from the direction to the rear of the vehicle 30. The communication control unit 14 sets the priority level 0 for the rear camera 32 when the vehicle 30 is moving forward and another vehicle or the like is not seen in the video data acquired from the rear camera 32, that is, when another vehicle or the like is not approaching the vehicle 30 from the direction to the rear of the vehicle 30.

Further, when the vehicle 30 is moving backward, the communication control unit 14 determines whether or not a pedestrian, another vehicle, an obstacle, a traffic signal, a traffic sign, or the like is seen in the video data acquired from the front camera 31 with reference to the information received from the peripheral state recognition unit 13. The communication control unit 14 sets the priority level 1 for the front camera 31 when the vehicle 30 is moving backward and another vehicle or the like is seen in the video data acquired from the front camera 31, that is, when another vehicle or the like is approaching the vehicle 30 from the direction to the front of the vehicle 30. The communication control unit 14 sets the priority level 0 for the front camera 31 when the vehicle 30 is moving backward and another vehicle or the like is not seen in the video data acquired from the front camera 31, that is, when another vehicle or the like is not approaching the vehicle 30 from the direction to the front of the vehicle 30.

Setting of the priority levels described in FIG. 3 is merely an example. For instance, in the case where the priority levels 0 to 3 are defined, the vehicle 30 is moving forward, and another vehicle or the like is seen in the video data of the video taken by the front camera 31, the front camera 31 may be set a higher priority level 3. Further, the priority level may be changed in accordance with the object seen in the video data.

The communication control unit 14 determines the priority level of each camera and then performs communication control in accordance with the priority level. For instance, the communication control unit 14 may perform control so that among the video data output from the communication unit 15 to the communication unit 11, only the video data of the video taken by the camera of the highest priority level is transmitted to the server 40 via the network 45. For instance, in the example shown in FIG. 3, the communication control unit 14 may perform control so that only the video data of the video taken by the camera for which the priority level 2 is set is transmitted. Only the video taken by the camera of the highest priority level may be transmitted to the server 40 via the network 45. With this configuration, it is possible to reduce the risks ascribable to congestion or lack of bandwidth in the network 45, such as the video data being discarded, destroyed, or greatly delayed. As a result, the communication apparatus 20 is able to transmit the video data of the video taken by the camera of the highest priority level to the server 40 without degrading the quality of the video data.

Further, the communication control unit 14 may employ the Priority-Based Flow Control. Specifically, a plurality of buffers sorted in accordance with the priority levels of the cameras are prepared, and the communication unit 15 stores the video data of the video taken by each camera in the buffer corresponding to the priority levels of the respective cameras. The communication control unit 14 may transmit the video data stored in the buffers to the server 40 in accordance with the descending order of the priority levels of the cameras. For instance, first, the communication control unit 14 transmits all video data stored in the buffer which stores video data of the video taken by the camera for which the priority level 2 is set. The communication control unit 14 may transmit the video data stored in the buffer which stores the video data of the video taken by the camera for which the priority level 1 is set after all video data of the video taken by the camera for which the priority level 2 is set has been transmitted. By transmitting the video data of the video taken by the camera having a high priority level to the server 40 preferentially over the video data of the video taken by another camera, it is possible to allocate without fail the communication resource to the video data of the video taken by the camera having a high priority level. In other words, it is possible to avoid shortage of the communication resource allocated to the video data of the video taken by the camera having a high priority level. As a result, the video data of the video taken by the camera having a high priority level is transmitted in quality higher than that of the video data of the video taken by another camera to the server 40.

Figure 4:
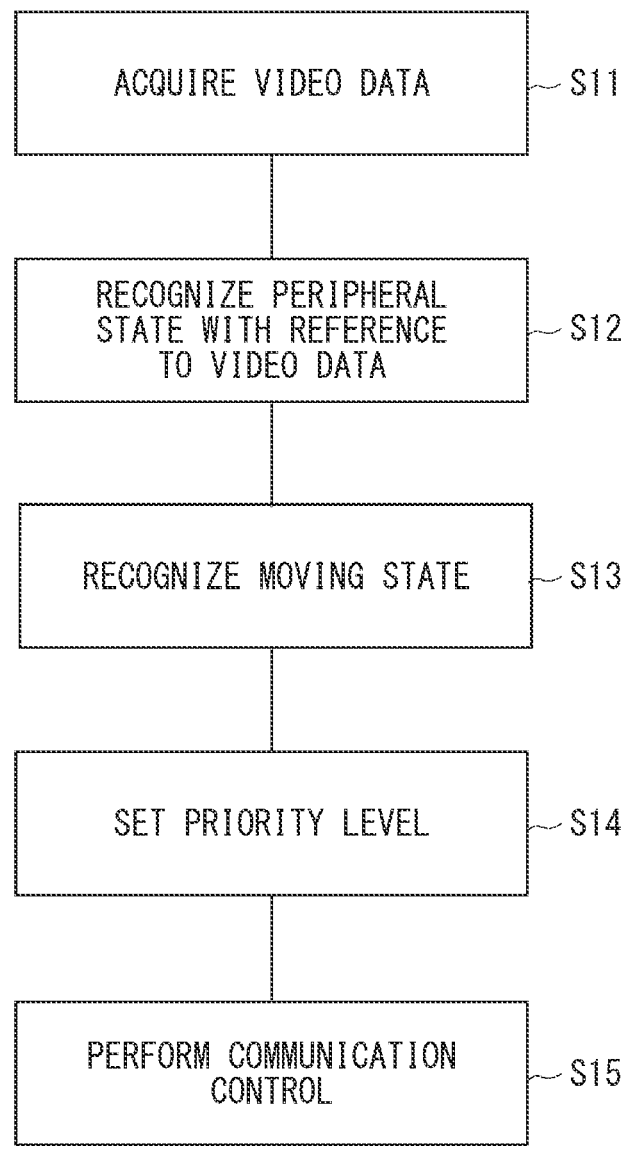
FIG. 4 is a diagram showing a flow of communication control processing performed in a communication apparatus according to the second example embodiment.

Next, the flow of communication control processing performed in the communication apparatus 20 will be described with reference to FIG. 4. First, the communication unit 15 acquires video data from a plurality cameras mounted on the vehicle 30 (S11). Then, the peripheral state recognition unit 13 recognizes the peripheral state of the vehicle 30 acquired by each camera with reference to the video data acquired from the plurality of cameras (S12). For instance, the peripheral state recognition unit 13 recognizes the peripheral state of the vehicle 30 acquired by each camera based on the traffic characteristics of the received video data. Alternatively, the peripheral state recognition unit 13 recognizes the peripheral state of the vehicle 30 acquired by each camera by analyzing the content of the images in the received video data.

Next, the moving state recognition unit 12 recognizes the moving state of the vehicle 30 (S13). For instance, the moving state recognition unit 12 recognizes the moving state of the vehicle 30 with reference to the control information such as information of an actuator or a sensor acquired via CAN.

Next, the communication control unit 14 determines the priority level of each camera mounted on the vehicle 30 with reference to the information received from the moving state recognition unit 12 and the peripheral state recognition unit 13 (S14). Next, the communication control unit 14 performs communication control so that video data of a video taken by a camera having a priority level higher than that of another camera can be transmitted in quality higher than that of the video data of a video taken by another camera (S15). For instance, the communication control unit 14 transmits only the video data of the video taken by the camera having the highest priority level to the server 40 via the network 45. Alternatively, the communication control unit 14 stores the video data in the buffer sorted in accordance with the priority levels of the cameras and transmits the video data in accordance with the descending order of the priority levels.

Note that in addition to the communication control performed by the aforementioned communication control unit 14, each camera or the communication control unit 14 may perform video control in accordance with the priority level of each camera or the transmission quality of the video data. For instance, as the video control, the communication control unit 14 may perform control of, for instance, the video bit rate, the video frame rate, the resolution, and the quality parameters specific to the encoding standard. Note that transmission quality of the video data includes, for instance, the transfer rate, the delay, the packet loss, and the jitter.

For instance, the communication control unit 14 may instruct the camera having a low priority level or the camera in which there are many packet losses to, for instance, lower the video bit rate, lower the video frame rate, or lower the resolution. With this configuration, it is possible to use an image quality suitable for the usable communication bandwidth in a camera having a low priority level and which has few usable communication bandwidth. As a result, for instance, it is possible to reduce the packet loss of the video data in the camera having a low priority level.

Further, the communication control unit 14 may instruct the camera having a high priority level to, for instance, increase the video bit rate, increase the video frame rate, or increase the resolution. With this configuration, it is possible to use an image quality suitable for the usable communication bandwidth in a camera having a high priority level and having many usable communication bandwidth. As a result, it is possible to realize improvement in the quality of the video data in the camera having a high priority level such as higher bit rate, higher frame rate, and higher resolution.

As described above, the communication control unit 20 determines the priority level of each camera with reference to the moving state of the vehicle 30 recognized by the moving state recognition unit 12 and the peripheral state of the vehicle acquired by each camera and recognized by the peripheral state recognition unit 13. Further, the communication apparatus 20 is able to transmit, to the server 40, the video data of the video taken by the camera having a high priority level in quality higher than that of the video data of a video taken by another camera having a lower priority level. As a result, the communication apparatus 20 is able to maintain the high quality of the video data of the video taken by the camera having a high priority level, that is, the video data having a high level of importance, and transmit the video data to the server 40.

Third Example Embodiment

Figure 5:
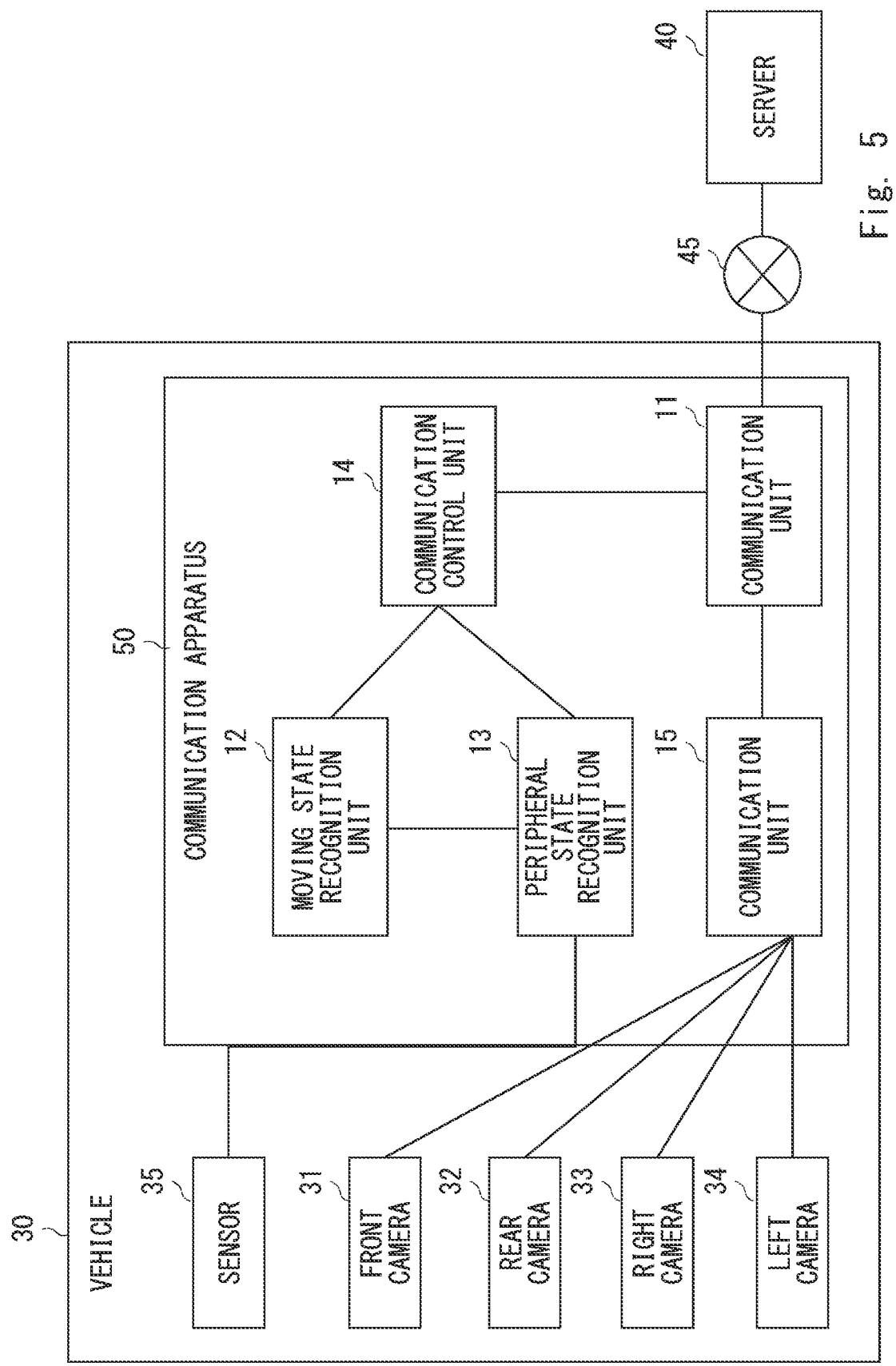
FIG. 5 is a configuration diagram of a communication apparatus according to a third example embodiment.

Next, a communication apparatus 50 according to a third example embodiment will be described with reference to FIG. 5. The peripheral state recognition unit 13 in the communication apparatus 50 recognizes the peripheral state of the vehicle 30 with reference to the information acquired from a sensor 35 which is a sensor besides the cameras mounted on the vehicle 30. For instance, the vehicle 30 has the sensor 35 such as a millimeter wave radar, an infrared camera, an ultrasonic sonar, or LiDAR (Light Detection and Ranging) mounted thereon. The peripheral state recognition unit 13 may recognize or detect the presence of a pedestrian, another vehicle, an obstacle, a traffic signal, a traffic sign, or the like in the periphery of the vehicle 30 with reference to the information acquired from each sensor 35. The peripheral state recognition unit 13 may recognize or detect the presence of a pedestrian, another vehicle, an obstacle, a traffic signal, a traffic sign, or the like in the periphery of the vehicle 30 with reference to the information acquired from each sensor in combination. Further, the peripheral state recognition unit 13 also recognizes at which position a pedestrian, another vehicle, an obstacle, a traffic signal, a traffic sign, or the like is present in the periphery of the vehicle 30. For instance, the peripheral state recognition unit 13 may recognize whether or not there is a pedestrian or the like in at least one of the direction to the front, the rear, the right, or the left of the vehicle 30.

Further, the vehicle 30 may recognize how far the pedestrian, another vehicle, the obstacle, the traffic signal, the traffic sign, or the like is away from the vehicle 30 with reference to the information acquired from each sensor.

The communication control unit 14 acquires, from the peripheral state recognition unit 13, the information indicating in which direction the pedestrian or the like is detected in the periphery of the vehicle 30. The communication control unit 14 determines the priority level of each of the front camera 31, the rear camera 32, the right camera 33, and the left camera 34 with reference to the information acquired from the moving state recognition unit 12 and the information acquired from the peripheral state recognition unit 13. For instance, the communication control unit 14 may set the priority level as shown in FIG. 3 when it is assumed that a pedestrian or the like is seen in the video data of the video taken by the camera which is disposed facing the direction in which the pedestrian or the like was detected.

As described above, the peripheral state recognition unit 13 is able to determine the priority level of each of the front camera 31, the rear camera 32, the right camera 33, and the left camera 34 with reference to the information acquired from the sensors different from the front camera 31, the rear camera 32, the right camera 33, and the left camera 34.

Fourth Example Embodiment

The priority level determined by the communication control unit 14 according to the fourth example embodiment will be described.

The communication control unit 14 is able to determine the priority level of the camera mounted on the vehicle 30 with reference to the predicted information obtained by predicting the future state of at least one of the moving state of the vehicle 30 and the peripheral state of the vehicle 30.

Firstly, prediction of the moving state by the moving state recognition unit 12 will be described. The moving state recognition unit 12 predicts the moving state of the vehicle after elapse of a prescribed time based on, for instance, the equipment information of the equipment mounted on the vehicle 30 or the traveling control information that can be acquired from a software for controlling traveling of the vehicle 30. Examples of the equipment information include information that can be acquired from the actuator or the sensor mounted on the vehicle such as the turn signal information, the gearshift information, the vehicle speed sensor information, and the brake information. For instance, the moving state recognition unit 12 is able to predict whether the vehicle is going to turn right or left with reference to the turn signal information. The moving state recognition unit 12 is able to predict whether the vehicle is going to move forward or backward with reference to the gearshift information. Further, the traveling control information includes information such as steering, braking, accelerating and decelerating of the vehicle, and a vehicle traveling route. These traveling control information may be acquired from a software such as an automotive navigation system for assisting driving in addition to a software for controlling traveling of the vehicle 30.

An example of determining the priority level of each camera by predicting the moving state of the vehicle 30 in accordance with the turn signal information will be described with reference to FIG. 6. The moving state recognition unit 12 predicts the direction in which the vehicle turns after elapse of the prescribed time with reference to the turn signal information acquired via CAN. For instance, when the turn signal information indicating that the vehicle is going to turn right is acquired, the moving state recognition unit 12 predicts that the vehicle 30 is going to move in the direction to the right thereof in A seconds (A is an integer equal to or larger than 0). Further, when the turn signal information indicating that the vehicle is going to turn left is acquired, the moving state recognition unit 12 predicts that the vehicle 30 is going to move in the direction to the left thereof in A seconds.

When it is predicted in the moving state recognition unit 12 that the vehicle 30 is going to move in the direction to the left thereof based on the turning signal information indicating that the vehicle 30 is going to turn left, the communication control unit 14 sets the priority level 2 for the left camera 34. When it is predicted in the moving state recognition unit 12 that the vehicle 30 is going to move in the direction to the right thereof based on the turning signal information indicating that the vehicle 30 is going to turn right, the communication control unit 14 sets the priority level 2 for the right camera 33.

Next, when it is predicted that the vehicle 30 is going to turn right, the communication control unit 14 determines whether or not a pedestrian, another vehicle, an obstacle, a traffic signal, a traffic sign, or the like is seen in the video data acquired from the left camera 34. When it is predicted that the vehicle 30 is going to turn right and another vehicle or the like is seen in the video data acquired from the left camera 34, that is, when another vehicle or the like is approaching the vehicle 30 from the direction to the left of the vehicle 30, the communication control unit 14 sets the priority level 1 for the left camera 34. When it is predicted that the vehicle 30 is going to turn right and another vehicle or the like is not seen in the video data acquired from the left camera 34, that is, when another vehicle or the like is not approaching the vehicle 30 from direction to the left of the vehicle 30, the communication control unit 14 sets the priority level 0 for the left camera 34.

Further, when it is predicted that the vehicle 30 is going to turn left, the communication control unit 14 determines whether or not a pedestrian, another vehicle, an obstacle, a traffic signal, a traffic sign, or the like is seen in the video data acquired from the right camera 33. When it is predicted that the vehicle 30 is going to turn left and another vehicle or the like is seen in the video data acquired from the right camera 33, that is, when another vehicle or the like is approaching the vehicle 30 from direction to the right of the vehicle 30, the communication control unit 14 sets the priority level 1 for the right camera 33. When it is predicted that the vehicle 30 is going to turn left and another vehicle or the like is not seen in the video data acquired from the right camera 33, that is, when another vehicle or the like is not approaching the vehicle 30 from the direction to the right of vehicle 30, the communication control unit 14 sets the priority level 0 for the right camera 33.

Next, prediction of the peripheral state by the peripheral state recognition unit 13 will be described. The peripheral state recognition unit 13 is able to predict the peripheral state of the vehicle to be acquired by a camera after elapse of a prescribed time with reference to the information acquired from the sensor 35 besides the cameras or the information acquired from another camera different from the aforementioned camera. For instance, the peripheral state recognition unit 13 specifies the distance between the vehicle 30 and the pedestrian or the like in the periphery of the vehicle 30 and in which direction the pedestrian or the like is present with reference to the information acquired from the sensor such as LiDAR. Further, the peripheral state recognition unit 13 may acquire information as regards the speed of the vehicle 30 from the moving state recognition unit 12. The peripheral state recognition unit 13 may predict that a pedestrian or the like will be seen on a camera after elapse of a prescribed time with reference to the distance between the vehicle 30 and the pedestrian or the like present in the periphery of the vehicle 30 and the information as regards the speed of the vehicle 30. For instance, the peripheral state recognition unit 13 may predict that a pedestrian or the like will be seen on a camera when the image of the pedestrian or the like is displayed in a size larger than the predetermined value in the video taken by the camera.

Further, the peripheral state recognition unit 13 may predict that a pedestrian or the like will be seen on a camera mounted on the vehicle 30 after elapse of a prescribed time with reference to the current location, the traveling direction, and the geographic information on the periphery of the vehicle. The peripheral state recognition unit 13 may specify the current location and the traveling direction of the vehicle using, for instance, the GNSS (Global Navigation Satellite System) such as the GPS (Global Positioning System). Further, the peripheral state recognition unit 13 may extract the geographic information on the periphery of the vehicle 30 with reference to the geographic information stored in the memory within the communication apparatus 20 (or the communication apparatus 50). Alternatively, the peripheral state recognition unit 13 may acquire the geographic information stored in another apparatus via the network 45 and extract the geographic information on the periphery of the vehicle 30 with reference to the acquired geographic information. For instance, when there is an intersection or a junction in the periphery of the vehicle 30, it may be predicted that a pedestrian or the like will be seen on the camera taking a video of the road that intersects or merges with the road on which the vehicle 30 is traveling after elapse of a prescribed time.

An example of determining the priority level of each camera by predicting the peripheral state of the vehicle 30 will be described with reference to FIG. 7. It is assumed, for instance, that the communication control unit 14 acquired, from the moving state recognition unit 12, the information indicating that the vehicle 30 is moving forward. In this case, the communication control unit 14 sets the priority level 2 for the front camera 31. The communication control unit 14 sets the priority level 2 for the rear camera 32 when the information indicating that the vehicle 30 is moving backward is acquired.

Next, the communication control unit 14 determines whether or not it is predicted that a pedestrian, another vehicle, an obstacle, a traffic signal, a traffic sign, or the like will be seen in the video data of the video taken by the rear camera 32 when the vehicle 30 is moving forward. The communication control unit 14 sets the priority level 1 for the rear camera 32 when the vehicle 30 is moving forward and prediction is made that another vehicle or the like will be seen in the video data of the video taken by the rear camera 32, that is, when it is predicted that another vehicle or the like is going to approach the vehicle 30 from the direction to the rear of the vehicle 30. The communication control unit 14 sets the priority level 0 for the rear camera 32 when the vehicle 30 is moving forward and prediction is made that another vehicle or the like will not be seen in the video data of the video taken by the rear camera 32, that is, when it is predicted that another vehicle or the like is not going to approach the vehicle 30 from the direction rear to the vehicle 30.

Further, the communication control unit 14 determines whether or not it is predicted that a pedestrian, another vehicle, an obstacle, a traffic signal, a traffic sign, or the like will be seen in the video data of the video taken by the front camera 31 when the vehicle 30 is moving backward. The communication control unit 14 sets the priority level 1 for the front camera 31 when the vehicle 30 is moving backward and prediction is made that another vehicle or the like will be seen in the video data of the video taken by the front camera 31, that is, when it is predicted that another vehicle or the like is going to approach the vehicle 30 from the direction to the front of the vehicle 30. The communication control unit 14 sets the priority level 0 for the front camera 31 when the vehicle 30 is moving backward and prediction is made that another vehicle or the like will not be seen in the video data of the video taken by the front camera 31, that is, when it is predicted that another vehicle or the like is not going to approach the vehicle 30 from the direction to the front of the vehicle 30.

Next, referring to FIG. 8, the method of determining the priority level different from those shown in FIGS. 6 and 7 will be described as regards the priority level determined by the communication control unit 14. FIG. 8 shows that the communication control unit 14 determines the priority level of each camera with reference to the predicted moving state of the vehicle and the predicted peripheral state of the vehicle.

The communication control unit 14 sets the priority level 2 for the left camera 34 when it is predicted in the moving state recognition unit 12 that the vehicle 30 is going to move in the direction to the left thereof based on the turning signal information indicating that the vehicle 30 is going to turn left. The communication control unit 14 sets the priority level 2 for the right camera 33 when it is predicted in the moving state recognition unit 12 that the vehicle 30 is going to move in the direction to the right thereof based on the turning signal information indicating that the vehicle 30 is going to turn right.

Next, when it is predicted that the vehicle 30 is going to turn right, the communication control unit 14 determines whether or not it is predicted that a pedestrian, another vehicle, an obstacle, a traffic signal, a traffic sign, or the like will be seen in the video data of the video taken by the left camera 34. When it is predicted that the vehicle 30 is going to turn right and that another vehicle or the like will be seen in the video data of the video taken by the left camera 34, that is, when it is predicted that another vehicle or the like is going to approach the vehicle 30 from the direction to the left of the vehicle 30, the communication control unit 14 sets the priority level 1 for the left camera 34. When it is predicted that the vehicle 30 is going to turn right and that another vehicle or the like will not be seen in the video data of the video taken by the left camera 34, that is, when it is predicted that another vehicle or the like is not going to approach the vehicle 30 from the direction to the left of the vehicle 30, the communication control unit 14 sets the priority level 0 for the left camera 34.

Further, when it is predicted that the vehicle 30 is going to turn left, the communication control unit 14 determines whether or not it is predicted that a pedestrian, another vehicle, an obstacle, a traffic signal, a traffic sign, or the like will be seen in the video data of the video taken by the right camera 33. When it is predicted that the vehicle 30 is going to turn left and that another vehicle or the like will be seen in the video data of the video taken by the right camera 33, that is, when it is predicted that another vehicle or the like is going to approach the vehicle 30 from the direction to the right of the vehicle 30, the communication control unit 14 sets the priority level 1 for the right camera 33. When it is predicted that the vehicle 30 is going to turn left and that another vehicle or the like will not be seen in the video data of the video taken by the right camera 33, that is, when it is predicted that another vehicle or the like is not going to approach the vehicle 30 from the direction to the right of the vehicle 30, the communication control unit 14 sets the priority level 0 for the right camera 33.

As described above, the communication control unit 14 is able to predict the future state of at least one of the moving state of the vehicle 30 and the peripheral state of the vehicle 30 and perform communication control with reference to the predicted information. Note that the timing at which future state of at least one of the moving state of the vehicle 30 and the peripheral state of the vehicle 30 is predicted and the timing at which communication control unit 14 performs control need not be the same timing. That is, the communication control unit 14 may perform communication control after predicting the future state as regards at least one of the moving state of the vehicle 30 and the peripheral state of the vehicle 30. At this time, the processing time taken in performing the communication control may be taken into account. For example, it is assumed that the moving state recognition unit 12 predicted, at time T0, that the time at which the moving state of the vehicle 30 changes is time T1. In this case, the timing at which the communication control unit 14 performs the communication control may be any timing between T0 to T1, inclusive. Further, when the bandwidth control is performed as the communication control and the processing time taken to perform the bandwidth control is $\alpha$, the communication control may be performed at the timing between T0 and T1-$\alpha$, inclusive.

As described above, the moving state recognition unit 12 is able to predict the moving state of the vehicle 30 after elapse of the prescribed time, and the peripheral state recognition unit 13 is able to predict the peripheral state of the vehicle 30 after elapse of the prescribed time. Further, the communication control unit 14 is able to predict the priority level of the camera mounted on the vehicle 30 with reference to the predicted information as regards at least one of the moving state of the vehicle 30 and the peripheral state of the vehicle 30. By this configuration, the communication control unit 14 is able to determine the priority level of the camera in view of the possible future conditions that may occur.

Fifth Example Embodiment

Figure 9:
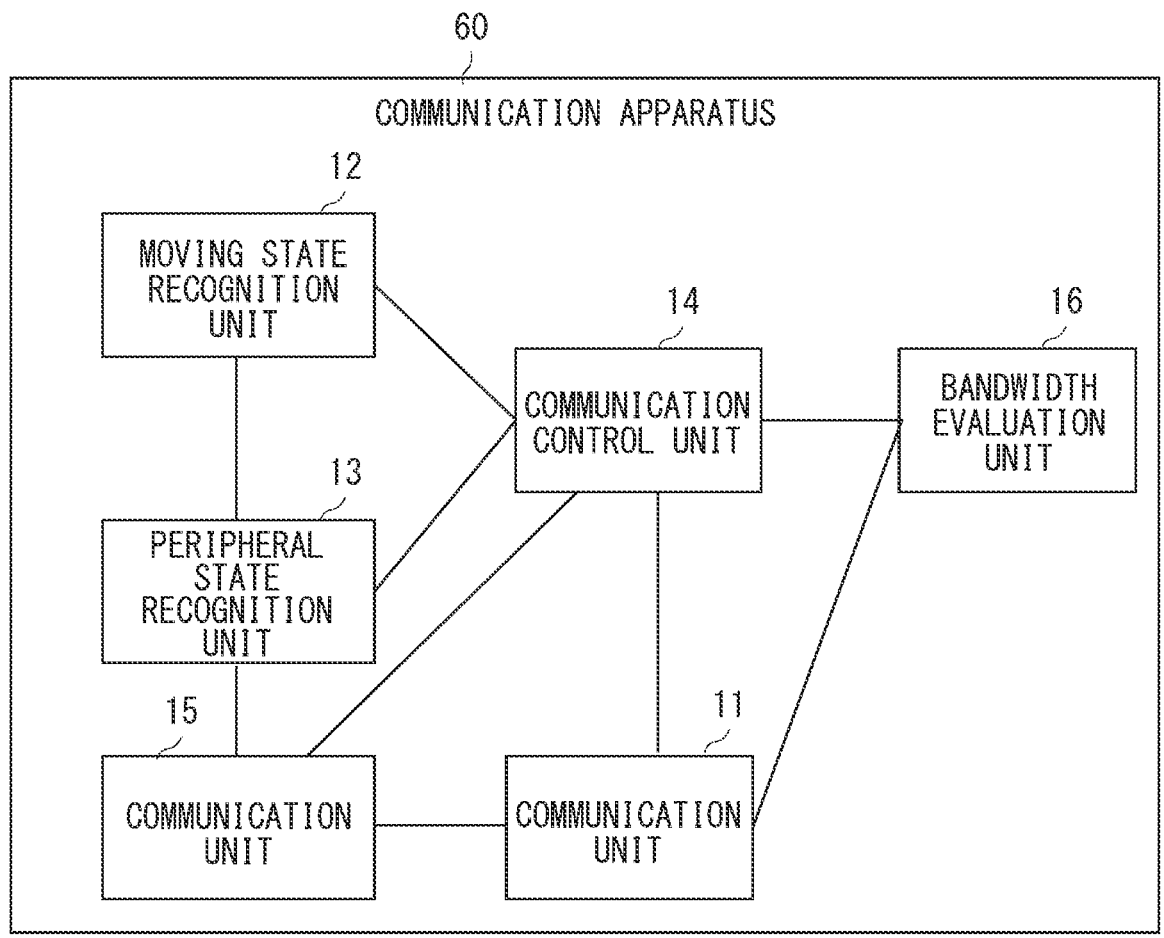
FIG. 9 is a configuration diagram of a communication apparatus according to a fifth example embodiment.

Next, a configuration example of a communication apparatus 60 will be described with reference to FIG. 9. The communication apparatus 60 has a configuration in which a bandwidth evaluation unit 16 is added to the communication apparatus 20 shown in FIG. 2. Further, the communication apparatus 60 may have a configuration in which the bandwidth evaluation unit 16 is added to the communication apparatus 50 shown in FIG. 5. Detailed description of the constituent components of the communication apparatus 60 that are the same as those of the communication apparatus 20 will be omitted.

The bandwidth evaluation unit 16 evaluates the communication line between the camera mounted on the vehicle 30 and the server 40 for an available bandwidth in at least a section thereof. The available bandwidth is a bandwidth that can be used in performing communication. A section of the communication line may be, for instance, a section of the communication line between the communication apparatus 60 and the server 40, a section of the communication line between the communication apparatus 60 and the camera, or a section of the communication line between the communication apparatus 60 and the base station configured in the mobile network.

In the section of the communication line which is the target of evaluation, the bandwidth evaluation unit 16 may perform transmission and reception of probe packets for evaluation via the communication unit 11 and evaluate the available bandwidth with reference to the information acquired from the probe packets. Evaluation of the available bandwidth may be rephrased as calculation of the available bandwidth. For instance, the bandwidth evaluation unit 16 may evaluate the available bandwidth by transmitting a plurality of probe packets and referring to the RTT (Round Trip Time) taken in receiving the response signals of the probe packets. Alternatively, the bandwidth evaluation unit 16 may evaluate the available bandwidth by observing the intervals between the received packets, that is, by observing the delay variation. Alternatively, the bandwidth evaluation unit 16 may evaluate the available bandwidth with reference to the TCP window size of the received response signal. As the evaluation method of the available bandwidth using the probe packets, another method that is commonly used may be used. The bandwidth evaluation unit 16 outputs the evaluation result of the available bandwidth to the communication control unit 14.

When the available bandwidth is evaluated for a section between the communication apparatus 60 and the server 40, the communication control unit 14 proportionally allocates the bandwidth for transmitting the video data of the video taken by each camera to the server 40 from among the available bandwidth in accordance with the determined priority level. When the available bandwidth is evaluated for the section between the communication apparatus 60 and the base station, the communication control unit 14 proportionally allocates the bandwidth for transmitting the video data of the video taken by each camera to the server 40 from among the available bandwidth in accordance with the determined priority level. For instance, the communication control unit 14 may allocate more bandwidth to the video data of the video taken by the camera for which the priority level 2 is set as shown in FIGS. 3 and 6 to 8 than to the video data of the video taken by the camera for which the priority level 0 or 1 is set as shown in FIGS. 3 and 6 to 8.

Alternatively, the communication control unit 14 may allocate the required bandwidth to the video data in the descending order of the priority levels of the cameras, that is, from the video data of the video taken by the camera for which a high priority level is set to the video data of the video taken by the camera for which a low priority level is set. For instance, in the case the amount of video data exceeds the available bandwidth when all video data of the video taken by each camera is transmitted to the server 40, the bandwidth required in transmitting the video data may be allocated to the video data in the descending order of the priority levels of the cameras. In this case, each video data may be allocated the same amount of bandwidth. Further, when every available bandwidth is allocated, the video data of the video taken by the camera for which a low priority level is set may not be allocated a bandwidth.

Further, when the available bandwidth is evaluated for the section between the camera and the communication apparatus 60, the communication control unit 14 proportionally allocates the bandwidth for transmitting the video data of the video taken by each camera to the server 40 from among the available bandwidth in accordance with the determined priority level of each camera. When the available bandwidth is evaluated for the section between the camera and the communication apparatus 60, the communication control unit 14 may allocate the bandwidth required in transmitting the video data of the video taken by each camera to the server 40 from among the available bandwidth in accordance with the determined priority level of each camera.

Further, the communication control unit 14 may determine the bandwidth allocated to each camera taking into consideration the video transmission performance of each camera. For instance, when the maximum video transmission bit rate determined in accordance with the video transmission performance is 10 Mbps, even if the bandwidth of 10 Mbps or more is allocated to the aforementioned camera, not all of the allocated bandwidth can be effectively utilized. In order to solve this problem, the maximum value of the bandwidth allocated to the aforementioned camera may be limited to the maximum video transmission bit rate. Further, in the case where the minimum video transmission bit rate determined in accordance with the video transmission performance is 500 Kbps, a problem may occur in performing the video transmission with the least quality when the bandwidth of 500 Kbps or less is allocated to the aforementioned camera. In order to solve this problem, it is desirable to limit the least value of the bandwidth allocated to the aforementioned camera to the minimum video transmission bit rate.

As described above, the communication apparatus 60 is able to evaluate at least a section of the communication line between the camera and the server 40 for the available bandwidth. Further, the communication apparatus 60 is able to allocate the available bandwidth preferentially to the video data of the video taken by the camera having a high priority level. With this configuration, it is possible to maintain the quality of the video data of the video taken by the camera having a high priority level higher than the quality of the video data of the video taken by the camera having a low priority level.

Sixth Example Embodiment

Figure 10:
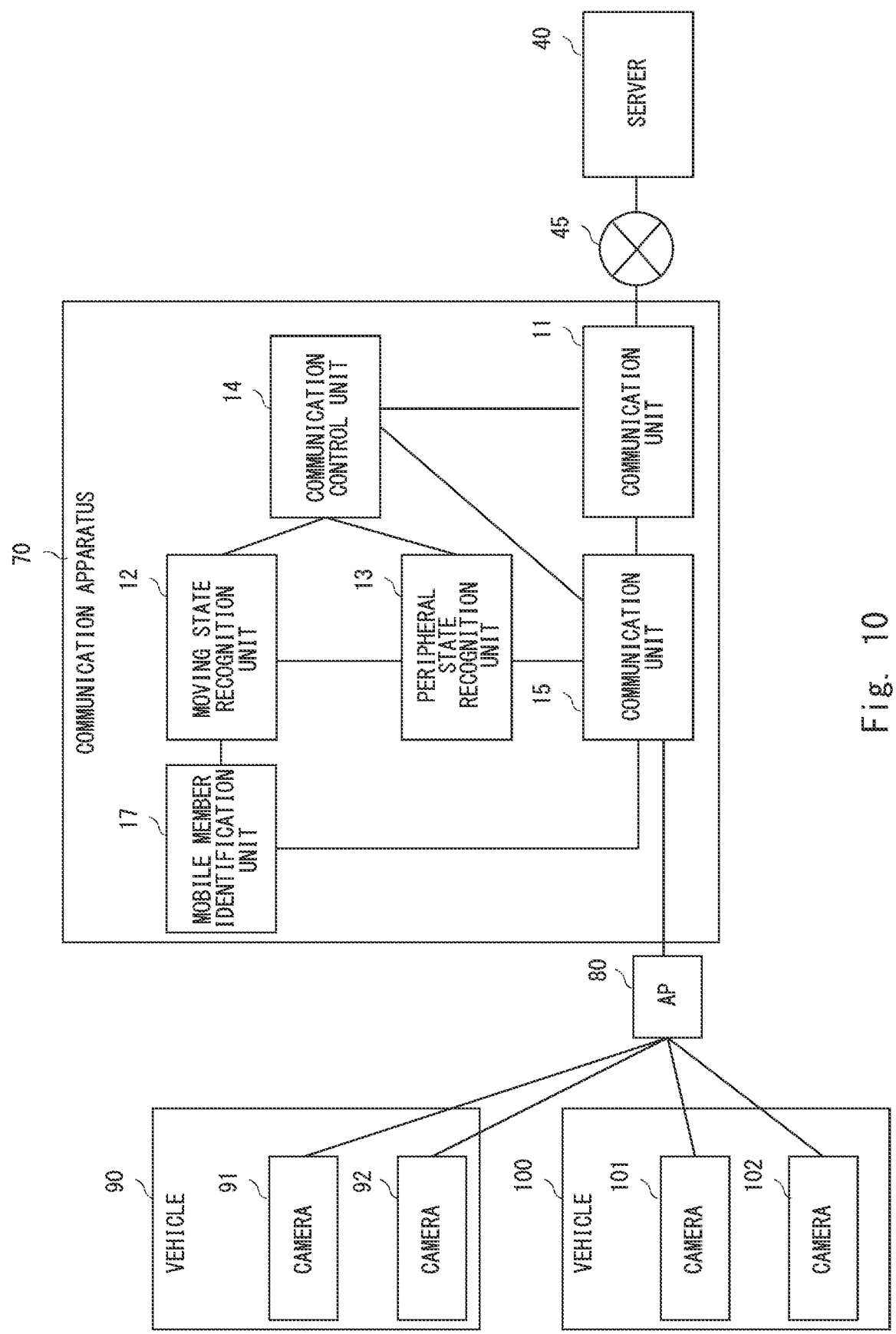
FIG. 10 is a configuration diagram of a communication system according to a sixth example embodiment.

Next, a configuration example of a communication system according to a sixth example embodiment will be described with reference to FIG. 10. A communication system shown in FIG. 10 includes a vehicle 90, a vehicle 100, an AP (Access Point) 80, a communication apparatus 70, the server 40, and the network 45. The vehicle 90 and the vehicle 100 may each be, for instance, an AGV (Automated Guided Vehicle) used in factory premises.

The vehicle 90 includes the camera 91 and the camera 92. Further, the vehicle 100 includes a camera 101 and a camera 102. Each camera mounted on the vehicle 90 and the vehicle 100 performs radio communication with the AP 80. The radio communication may be, for instance, a wireless LAN communication. Each camera mounted on the vehicle 90 and the vehicle 100 transmits the video data to the communication apparatus 70 via the AP 80.

The communication apparatus 70 is connected to the AP 80. Detailed description of the other constituent components of the communication system shown in FIG. 10 will be omitted since they are the same as those of the communication system shown in FIG. 2.

Next, the configuration example of the communication apparatus 70 will be described. The communication apparatus 70 has a configuration in which a mobile body identification unit 17 is added to the communication apparatus 20 shown in FIG. 2. Further, the communication control unit 14 performs communication control of the video data transmitted by each camera mounted on the vehicle 90 and the vehicle 100 via the communication unit 15. Detailed description of the other constituent components of the communication apparatus 70 will be omitted since they are the same as those of the communication apparatus 20 shown in FIG. 2.

The mobile body identification unit 17 acquires the video data transmitted from each camera mounted on the vehicle 90 and the vehicle 100 via the communication unit 15. The communication apparatus 70 acquires the video data from a plurality of vehicles. Therefore, it is necessary to identify, for each video data, the vehicle in which the camera that took the video is disposed. Therefore, the mobile body identification unit 17 specifies the camera group disposed in the same vehicle based on the interrelationship among the video data of the videos taken by the camera 91, the camera 92, the camera 101, and the camera 102.

The interrelationship among the video data may be rephrased as, for instance, the correlation among the video data. It can be said that the correlation among the video data is high when, for instance, there is a change in the images in the video data and the rate of the change is the same in every video data, or the rate of the change is similar in every video data. Further, it can be said that the correlation among the video data is high when the traveling direction of the vehicle specified from each video data is the same. Further, it can be said that the correlation among the video data is high when the image of the same object is included in each video data at the same time or within a certain period of time.

The mobile body identification unit 17 specifies the video data having a correlation higher than a predetermined threshold value by analyzing the content of the images in each video data and determines that the camera group that took the specified video data is disposed in the same vehicle.

The communication control unit 14 may determine the priority levels shown in FIGS. 3 and 6 to 8 for every specified camera group, that is, for every specified vehicle. Further, the communication control unit 14 may associate the video data with the information identifying the camera group and transmit the video data and the information identifying the camera group to the server 40.

As described above, the communication apparatus 70 may acquire, from the plurality of vehicles, the video data of the video taken by the camera mounted on each vehicle when the communication apparatus 70 is not mounted on a specific vehicle. Even in such case, the communication apparatus 70 is able to specify the camera group mounted on the same vehicle by analyzing the interrelationship among the video data. Further, the server 40 is able to recognize the video data for every vehicle by causing the communication apparatus 70 to transmit the video data and the information identifying the camera group to the server 40. As a result, the server 40 is able to easily perform monitoring and control of each vehicle.

The configuration example of each of the communication apparatus 10, the communication apparatus 20, the communication apparatus 50, the communication apparatus 60, and the communication apparatus 70 (hereinbelow collectively referred to as the communication apparatus 10 or the like) will be described below.

Figure 11:
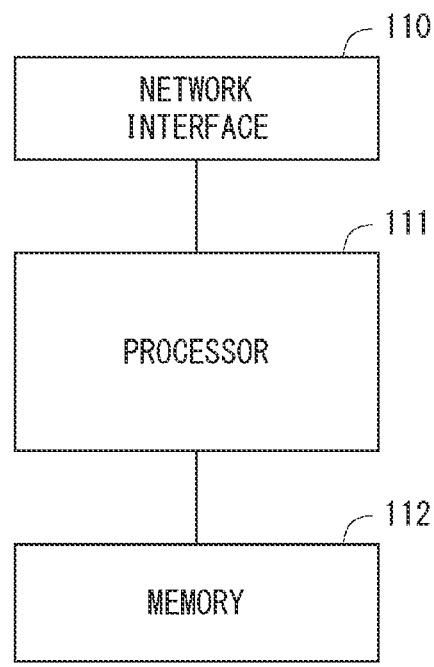
FIG. 11 is a configuration diagram of the communication apparatus according each of the example embodiments.

FIG. 11 is a block diagram showing a configuration example of the communication apparatus 10 or the like. Referring to FIG. 11, the communication apparatus 10 or the like includes a network interface 1201, a processor 1202, and a memory 1203. The network interface 1201 is used for performing communication with other network node that configures the communication system. The network interface 1201 may include, for instance, a network interface card (NIC) conforming to the IEEE 802.3 series. Alternatively, the network interface 1201 may be used to perform radio communication. For instance, the network interface 1201 may be used for performing the wireless LAN communication or the mobile communication defined by 3GPP (3rd Generation Partnership Project).

The processor 1202 reads-out a software (a computer program) from the memory 1203 and executes the program, thereby the processing of the communication apparatus 10 or the like described in the aforementioned embodiment examples using sequence charts and flow charts are performed. The processor 1202 may be, for instance, a microprocessor, MPU (Micro Processing Unit), or CPU (Central Processing Unit). The processor 1202 may include a plurality of processors.

The memory 1203 is configured of a combination of a volatile memory and a non-volatile memory. The memory 1203 may include a storage disposed at a position away from the processor 1202. In this case, the processor 1202 may access the memory 1203 via an I/O interface (not shown).

In the example shown in FIG. 11, the memory 1203 is used for storing the software module group. The processor 1202 is able to perform the processing of the communication apparatus 10 or the like described in the aforementioned example embodiments by reading-out the software module group from the memory 1203.

As described above with reference to FIG. 11, each processor of the communication apparatus 10 or the like executes one or a plurality of programs including an instruction group for causing the computer to execute the algorithm described with reference to the figures.

The program can be stored and provided to a computer using any type of non-transitory computer readable media. Non-transitory computer readable media include any type of tangible storage media. Examples of non-transitory computer readable media include magnetic storage media, optical magnetic storage media (e.g. magneto-optical disks), CD-ROM (compact disc read only memory), CD-R (compact disc recordable), CD-R/W (compact disc rewritable), and semiconductor memories. The magnetic storage media may be, for instance, floppy disks, magnetic tapes, and hard disk drives. The semiconductor memories may be, for instance, mask ROM, PROM (programmable ROM), EPROM (erasable PROM), flash ROM, and RAM (random access memory). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described example embodiments and can be modified as appropriate without departing from the scope and spirit of the disclosure.

The whole or part of the example embodiments disclosed above can be described as, but not limited to, the following supplementary notes.

Supplementary Note 1

A communication apparatus comprising:
a communication unit configured to transmit sensor information detected using at least two or more sensors disposed in a mobile body, the two or more sensors being adapted to detect states of the mobile body in directions different from one another with the mobile body being a base point;
a moving state recognition unit configured to recognize a moving state of the mobile body;
a peripheral state recognition unit configured to recognize a peripheral state of the mobile body; and
a communication control unit configured to determine a priority level of each of the two or more sensors based on the moving state and the peripheral state and perform communication control so that the sensor information detected by the sensor having a high priority level is transmittable in quality higher than that of the sensor information detected by the sensor having a low priority level.

Supplementary Note 2

The communication apparatus described in Supplementary note 1, wherein
the sensor information includes video data of a video taken by each of at least two or more cameras disposed in the mobile body, the two or more cameras being adapted to detect the states of the mobile body in the directions different from one another with the mobile body being a base point; and
the communication control unit is configured to determine the priority level of each of the two or more cameras and perform communication control so that a video taken by the camera having a high priority level is transmittable in quality higher than that of the video taken by the camera having a low priority level.

Supplementary Note 3

The communication apparatus described in Supplementary note 2, wherein the peripheral state recognition unit is configured to recognize the peripheral state with reference to the video data of the video taken by each of the two or more cameras.

Supplementary Note 4

The communication apparatus described in Supplementary note 3, wherein the peripheral state recognition unit is configured to recognize the peripheral state with reference to traffic characteristics of the video data of the video taken by each of the two or more cameras.

Supplementary Note 5

The communication apparatus described in Supplementary note 3, wherein the peripheral state recognition unit is configured to analyze the content of images in the video data of the video taken by each of the two or more cameras and recognizes the peripheral state.

Supplementary Note 6

The communication apparatus described in Supplementary note 2, wherein the peripheral state recognition unit is configured to recognize the peripheral state based on at least one of a millimeter wave radar, an infrared camera, an ultrasonic sonar, and LiDAR disposed in the mobile body.

Supplementary Note 7

The communication apparatus described in any one of Supplementary notes 1 to 6, wherein the moving state recognition unit is configured to recognize the moving state with reference to equipment information of equipment mounted on the mobile body that is acquirable via a network installed in the mobile body.

Supplementary Note 8

The communication apparatus described in any one of Supplementary notes 1 to 6, wherein the moving state is recognized with reference to traveling control information that is acquirable from a software for controlling traveling of the mobile body.

Supplementary Note 9

The communication apparatus described in any one of Supplementary notes 1 to 8, wherein
the moving state recognition unit is configured to predict the moving state of the mobile body after elapse of a prescribed time,
the peripheral state recognition unit is configured to predict the peripheral state of the mobile body after elapse of a prescribed time, and
the communication control unit is configured to determine the priority level of each of the two or more sensors based on the moving state that is the current moving state or the moving state after elapse of the prescribed time and the peripheral state that is the current peripheral state or the peripheral state after elapse of the prescribed time.

Supplementary Note 10

The communication apparatus described in Supplementary note 9, wherein the peripheral state recognition unit is configured to predict the peripheral state of the mobile body after elapse of the prescribed time with reference to the current location of the mobile body, a moving direction of the mobile body, and geographic information.

Supplementary Note 11

The communication apparatus described in Supplementary note 9 or 10, wherein the moving state recognition unit is configured to predict the moving state of the mobile body after elapse of the prescribed time with reference to the equipment information of the equipment mounted on the mobile body or the traveling control information that is acquirable from the software for controlling traveling of the mobile body.

Supplementary Note 12

The communication apparatus described in any one of Supplementary notes 1 to 11, further comprising a bandwidth calculation unit configured to calculate an available bandwidth which is usable in the communication line used in transmitting the sensor information,
  wherein the communication control unit is configured to allocate more bandwidth to the sensor information detected by the sensor having a high priority level than to the sensor information detected by the sensor having a low priority level.

Supplementary Note 13

The communication apparatus described in any one of Supplementary notes 1 to 12, wherein the communication unit further comprises a mobile body recognition unit configured to receive the sensor information from a plurality of the mobile bodies and specify at least one of the sensors mounted on the same mobile body based on the interrelationship among the sensor information acquired from the plurality of the mobile bodies.

Supplementary Note 14

A communication control method comprising:
  recognizing a moving state of a mobile body;
  recognizing a peripheral state of the mobile body;
  determining a priority level of each of at least two or more sensors disposed in the mobile body based on the moving state and the peripheral state, the two or more sensors being adapted to detect the states of the mobile body in directions different from one another with the mobile body being a base point;
  performing communication control so that sensor information detected by the sensor having a high priority level is transmittable in quality higher than that of sensor information detected by the sensor having a low priority level; and
  transmitting the sensor information.

Supplementary Note 15

A program for causing a computer to perform the processes of:
  recognizing a moving state of a mobile body;
  recognizing a peripheral state of the mobile body;
  determining a priority level of each of at least two or more sensors disposed in the mobile body based on the moving state and the peripheral state, the two or more sensors being adapted to detect the states of the mobile body in directions different from one another with the mobile body being a base point;
  performing communication control so that sensor information detected by the sensor having a high priority level is transmittable in quality higher than that of sensor information detected by the sensor having a low priority level; and
  transmitting the sensor information.

Note that the present disclosure is not limited to the aforementioned example embodiments, and can be appropriately changed without departing from the spirit of the present disclosure.

While the present disclosure has been described with reference to the example embodiments, the present disclosure is not limited to the aforementioned example embodiments. Various modifications that can be understood by those skilled in the art can be made to the configurations and the details of the present disclosure within the scope of the present disclosure.

This application is based upon and claims the benefit of priority from Japanese patent application No. 2018-205344, filed on Oct. 31, 2018, the disclosure of which is incorporated herein in its entirety by reference.

REFERENCE SIGNS LIST

10 COMMUNICATION APPARATUS
11 COMMUNICATION UNIT
12 MOVING STATE RECOGNITION UNIT
13 PERIPHERAL STATE RECOGNITION UNIT
14 COMMUNICATION CONTROL UNIT
15 COMMUNICATION UNIT
16 BANDWIDTH EVALUATION UNIT
17 MOBILE BODY IDENTIFICATION UNIT
20 COMMUNICATION APPARATUS
30 VEHICLE
31 FRONT CAMERA
32 REAR CAMERA
33 RIGHT CAMERA
34 LEFT CAMERA
35 SENSOR
40 SERVER
45 NETWORK
50 COMMUNICATION APPARATUS
60 COMMUNICATION APPARATUS
70 COMMUNICATION APPARATUS
80 AP
90 VEHICLE
91 CAMERA
92 CAMERA
100 VEHICLE
101 CAMERA
102 CAMERA

What is claimed is:
1. A communication apparatus comprising:
  at least one memory storing instructions, and
  at least one processor configured to execute the instructions to:
  transmit sensor information detected using at least two or more sensors disposed in a mobile body, the two or more sensors being adapted to detect states of the mobile body in directions different from one another with the mobile body being a base point;

recognize a moving state of the mobile body;

recognize a peripheral state of the mobile body based on traffic characteristics of the sensor information taken by each of the two or more sensors, the traffic characteristic including a transfer rate, an average packet interval, an average packet size, and a jitter;

determine a priority level of each of the two or more sensors based on the moving state and the peripheral state; and control transmitting the sensor information so that the sensor information detected by the sensor having a high priority level is transmittable in a higher quality than a quality of the sensor information detected by the sensor having a low priority level, wherein the sensor information includes video data taken by each of at least two or more cameras disposed in the mobile body, the two or more cameras being adapted to detect the states of the mobile body in the directions different from one another with the mobile body being a base point.

2. The communication apparatus according to claim 1, wherein to recognize the peripheral state of the mobile body based on the packet characteristics of the sensor information taken by each of the two or more sensors is to recognize the peripheral state based on the packet characteristics of the video data taken by each of the two or more cameras.

3. The communication apparatus according to claim 1, wherein the at least one processor is further configured to execute the instructions to recognize the moving state with reference to equipment information of equipment mounted on the mobile body that is acquirable via a network installed in the mobile body.

4. The communication apparatus according to claim 1, wherein the moving state is recognized with reference to traveling control information that is acquirable from a software for controlling traveling of the mobile body.

5. The communication apparatus according to claim 1, wherein the at least one processor is further configured to execute the instructions to:

predict the moving state of the mobile body after elapse of a first prescribed time;

predict the peripheral state of the mobile body after elapse of a second prescribed time; and determine the priority level of each of the two or more sensors based on the moving state that is the current moving state or the moving state after elapse of the first prescribed time and the peripheral state that is the current peripheral state or the peripheral state after elapse of the second prescribed time.

6. The communication apparatus according to claim 5, wherein the at least one processor is further configured to execute the instructions to predict the peripheral state of the mobile body after elapse of the second prescribed time with reference to the current location of the mobile body, a moving direction of the mobile body, and geographic information.

7. The communication apparatus according to claim 5, wherein the at least one processor is further configured to execute the instructions to predict the moving state of the mobile body after elapse of the first prescribed time with reference to the equipment information of the equipment mounted on the mobile body or the traveling control information that is acquirable from the software for controlling traveling of the mobile body.

8. The communication apparatus according to claim 1, wherein the at least one processor is further configured to execute the instructions to:

calculate an available bandwidth in a communication line used in transmitting the sensor information; and allocate more bandwidth to the sensor information detected by the sensor having a high priority level than to the sensor information detected by the sensor having a low priority level.

9. The communication apparatus according to claim 1, wherein a plurality of mobile bodies are provided, and wherein the at least one processor is further configured to execute the instructions to receive the sensor information from a plurality of the mobile bodies and specify at least one of the sensors mounted on the same mobile body based on the interrelationship among the sensor information acquired from the plurality of the mobile bodies.

10. A communication control method comprising:

transmitting sensor information detected using at least two or more sensors disposed in a mobile body, the two or more sensors being adapted to detect states of the mobile body in directions different from one another with the mobile body being a base point;

recognizing a moving state of the mobile body;

recognizing a peripheral state of the mobile body based on traffic characteristics of the sensor information taken by each of the two or more sensors, the traffic characteristic including a transfer rate, an average packet interval, an average packet size, and a jitter;

determining a priority level of each of the two or more sensors based on the moving state and the peripheral state; and controlling transmitting the sensor information so that sensor information detected by the sensor having a high priority level is transmittable in a higher quality than a quality of the sensor information detected by the sensor having a low priority level, wherein the sensor information includes video data taken by each of at least two or more cameras disposed in the mobile body, the two or more cameras being adapted to detect the states of the mobile body in the directions different from one another with the mobile body being a base point.

11. The communication control method according to claim 10, wherein recognizing the peripheral state of the mobile body based on the packet characteristics of the sensor information taken by each of the two or more sensors comprises recognizing the peripheral state based on the packet characteristics of the video data taken by each of the two or more cameras.

12. The communication control method according to claim 10, wherein the moving state is recognized with reference to equipment information of equipment mounted on the mobile body that is acquirable via a network installed in the mobile body.

13. The communication control method according to claim 10, wherein the moving state is recognized with reference to traveling control information that is acquirable from a software for controlling traveling of the mobile body.

14. The communication control method according to claim 10, further comprising:

predicting the moving state of the mobile body after elapse of a first prescribed time;

predicting the peripheral state of the mobile body after elapse of a second prescribed time; and determining the priority level of each of the two or more sensors based on the moving state that is the current moving state or the moving state after elapse of the first prescribed time and the peripheral state that is the current peripheral state or the peripheral state after elapse of the second prescribed time.

15. The communication control method according to claim 10, further comprising predicting the peripheral state of the mobile body after elapse of the second prescribed time with reference to a current location of the mobile body, a moving direction of the mobile body, and geographic information.

16. The communication control method according to claim 10, further comprising predicting the moving state of the mobile body after elapse of the first prescribed time with reference to equipment information of equipment mounted on the mobile body or traveling control information that is acquirable from software for controlling traveling of the mobile body.

17. The communication control method according to claim 10, further comprising:
 calculating an available bandwidth in a communication line used in transmitting the sensor information; and
 allocating more bandwidth to the sensor information detected by the sensor having a high priority level than to the sensor information detected by the sensor having a low priority level.

18. The communication control method according to claim 10, wherein a plurality of mobile bodies are provided, and wherein the method further comprises:
 receiving the sensor information from the plurality of the mobile bodies; and
 specifying at least one of the sensors mounted on the same mobile body based on the interrelationship among the sensor information acquired from the plurality of the mobile bodies.

* * * * *